United States Patent [19]

Endoy et al.

[11] Patent Number: 5,595,273

[45] Date of Patent: Jan. 21, 1997

[54] REVERSE LOCK FOR ONE-WAY CLUTCH

[75] Inventors: Robert Endoy, Troy; Edward J. Debler, Jr., Sterling Heights; Mark A. Hanke, Farmington Hills, all of Mich.

[73] Assignee: Ford Motor Company, Dearborn, Mich.

[21] Appl. No.: 488,520

[22] Filed: Jun. 9, 1995

[51] Int. Cl.⁶ .................. F16D 41/067; F16D 43/24; F16D 43/04
[52] U.S. Cl. .................. 192/45; 192/103 B; 192/103 C
[58] Field of Search .................. 192/45, 103 B, 192/103 C, 38

[56] References Cited

U.S. PATENT DOCUMENTS

| | | | |
|---|---|---|---|
| 1,597,970 | 8/1926 | Hartley | 192/45 X |
| 2,262,330 | 11/1941 | MacNeil et al. | 192/103 C |
| 2,391,350 | 12/1945 | Schmidt | 192/45 |
| 2,433,553 | 12/1947 | Heintze | 192/45 X |
| 2,555,152 | 5/1951 | Pullin et al. | 192/45 X |
| 3,012,645 | 12/1961 | Gensheimer et al. | 192/45 |
| 3,369,638 | 2/1968 | Hunt et al. | 192/38 |
| 4,549,638 | 10/1985 | Johnston | 192/45 |

*Primary Examiner*—Rodney H. Bonck
*Attorney, Agent, or Firm*—Frank G. McKenzie; James J. Dottavio

[57] ABSTRACT

A one-way clutch uses an inertial device to urge a roller out of a recess in a caging member and into wedging contact between the inner and outer races of the one-way clutch.

10 Claims, 1 Drawing Sheet

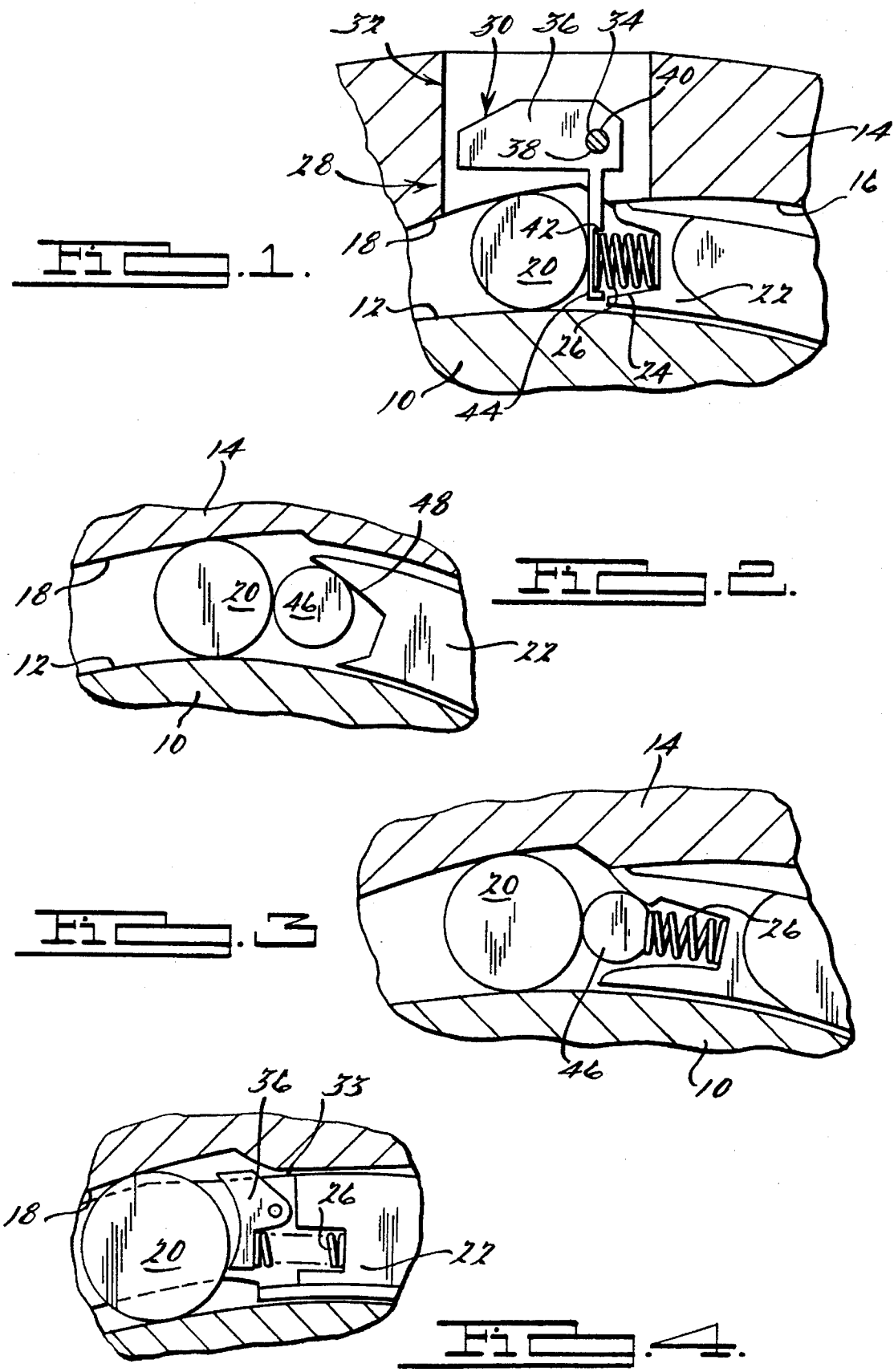

REVERSE LOCK FOR ONE-WAY CLUTCH

BACKGROUND OF THE INVENTION

1. Field of the Invention

This invention relates to the field of one-way clutches. More particularly, this invention pertains to preventing clutch roller disengagement in a one-way clutch during a rotating non-driven state in an automotive transmission application.

2. Description of the Prior Art

The present invention relates to a one-way roller clutch. One-way clutches are utilized for a wide variety of purposes, including automotive automatic transmission applications. Such clutches are employed to provide unidirectional drive between a driving and a driven member while permitting the driven member to overrun the driving member or to rotate in an opposite direction without interference from the driving member. One form of such a clutch employs an annular inner member having a cylindrical outer surface. Provided adjacent the inner member is a coaxial annular outer member with an annular inner surface having a plurality of wedging surfaces. A caging member encircles the inner member and defines a number of recesses in which individual balls or rollers are received between the inner and outer members. A roller biasing spring is positioned within each recess of the caging member. The biasing springs urge the balls or rollers out of the recess and into contact with the wedging surface of the outer member.

In such an one-way clutch, as the balls or rollers are urged against the wedging surface of the outer member, the balls or rollers are forced into engagement with the cylindrical surface of the inner member, providing a driving relationship in one rotational direction while permitting the overrunning condition while the members rotate in the opposite direction.

In prior art designs, while both shafts rotate in the same direction, if the driving shaft ceases to drive the driven shaft, but both shafts continue to rotate in the same direction, the outer member may rotate at a higher speed than the inner member. This difference in speed may result in the roller or ball to no longer being wedged between the inner and outer members. As the outer surface rotates at a higher speed than the inner race, the wedging surface forces the ball or roller at high speed into the recess of the caging member, causing the spring to be compressed. At such high speeds, the force from the roller may damage the spring or displace the spring from within the recess of the caging member. It would be thus be desirable to provide a means to prevent the roller from becoming disengaged from between the surfaces of the inner and outer members.

SUMMARY OF THE INVENTION

In prior art designs, there is no means to prevent the ball or roller of an one-way clutch from becoming disengaged from between the surfaces of the inner and outer members. It is an object of the present invention to provide a means for preventing the roller from becoming disengaged with the inner and outer races when the races are not being driven, yet rotate in the same direction. A further object is to prevent disengagement or damage to the biasing spring.

A device according to the present invention for preventing the disengagement of the roller includes an inertial means which urges the roller out of the recess of a caging member and into wedging contact between the inner and outer races.

BRIEF DESCRIPTION OF THE DRAWINGS

FIG. 1 is a side view of an one-way clutch according to the present invention.

FIG. 2 is an alternate embodiment of an one-way clutch according to the present invention.

FIG. 3 is a modification of the second embodiment shown in FIG. 2.

FIG. 4 is a modification of the first embodiment shown in FIG. 1.

DETAILED DESCRIPTION OF THE PREFERRED EMBODIMENTS

Referring to FIG. 1, an one-way clutch, to which the present invention may be applied, includes an inner member 10 with an outer surface 12. A coaxial and coextensive outer member 14 is provided with an inner surface 16 adjacent the outer surface 12 of the inner member 10. The inner surface 16 of the outer member 16 has a plurality of wedging surfaces 18, alternatively known as cammed surfaces. In the preferred embodiment, fourteen (14) wedging surfaces 18 are evenly spaced around the periphery of the inner surface 16.

A plurality of clutch rollers 20 are disposed between the inner surface 16 and outer surface 12. In the preferred embodiment, one of said clutch rollers 20 is positioned adjacent each of the wedging surfaces 18. The clutch rollers 20 may have a cylindrical shape, as is in the preferred embodiment, or a spherical shape. Also provided between the inner and outer races 10, 14, is a caging member 22 which defines a plurality of recesses 24 in which the clutch rollers 20 are received between the inner and outer races 10, 14. A roller biasing spring 26 is positioned within each recess 24 of the caging member 22. The biasing springs 26 urge the clutch rollers 20 out of the recesses 24 and into contact with the wedging surface 18 of the outer race 14.

Also provided within one or more of the recesses 24 is an inertial roller biasing means 28. The biasing means 28 urges the roller 20 out of the recess 24 and toward the wedging surface 18. Thus, as the outer race 14 attempts to rotate at a higher speed than the inner race 10, the inertial biasing means 28 maintains the clutch roller 20 in a wedged condition between the inner and outer races 10, 14.

In the preferred embodiment, as illustrated in FIG. 1, the inertial biasing means 28 comprises a counterweight 30 pivotally mounted in a slot 32 within the outer race 14. The counterweight 30 of the preferred embodiment has a hole 34 through the main body 36 of the counterweight 30. A pin 38 is inserted through the main body 36 of the counterweight and through an axial hole 40 in the outer race 14. Alternatively, the counterweight 30 could have deflectable tabs (not shown) which would engage slots or holes within the slot 32 in the outer race 14. In the preferred embodiment, the counterweight 30 has a recess 42 which engages the biasing spring 26 to maintain a relative position. An alternate embodiment of the counterweight 30 design described above provides a slot 33, as shown in FIG. 4 in the caging member 22 and mounts the counterweight 30 within the slot of the caging member 22 in a manner similar to that described above.

In the preferred embodiment, when the outer race 14 rotates in a clockwise rotation as shown in FIG. 1, the counterweight 30 pivots in a clockwise manner about the pivot pin 38 due to centrifugal force on the counterweight 30. As the counterweight 30 so rotates, an arm 44 on the counterweight 30 urges the clutch roller 20 into engagement with the wedging surface 18, keeping the clutch locked up and both races 10, 14 rotating at the same speed.

Alternatively, the wedging surfaces 18 could be provided on the outer surface 12 of the inner member 10. A slot (not shown) is provided in the outer surface of the inner race and the counterweight 30 is mounted therein, in a manner similar to that described above where the counterweight 30 is provided in the outer race 14.

FIG. 2 shows an alternate embodiment of an inertial biasing means 28, which comprises a reverse engagement roller 46. As shown in FIG. 2, a reverse engagement roller 46 is positioned in a recess 24 of the caging member 22. During rotation, the reverse engagement roller 46 is urged radially outward due to centrifugal force. As the reverse engagement roller 46 is centrifugally forced outward, the roller 46 encounters a ramped surface 48 in the recess 24 of the caging member 22. The resulting radial component of the centrifugal force on the ramped surface 48 urges the reverse engagement roller 46 out of the recess and toward the wedging surface 18 on the outer race 14. The one-way clutch is thereby locked up and both races 10, 14 rotate at the same rotational speed. As shown in FIG. 3, this second embodiment also may include a biasing spring 26 between the reverse engagement roller 46 and caging member 22.

Alternatively, if the races 10, 14 were intended to be locked up while rotated in the counterclockwise direction, the wedging surface 18, counterweight 30 and roller 46 designs would be a mirror image of that shown in FIGS. 1–3.

Although the preferred embodiment of the present invention has been disclosed, various changes and modifications may be made without departing from the scope of the invention as set forth in the appended claims.

What is claimed is:

1. A one-way roller clutch, comprising:

a first race having a first annular surface;

a second race having a second annular surface with a wedging surface adjacent said first surface;

a clutch roller interposed between said first and second annular surfaces;

a cage means having a recess for retaining said clutch roller between said first and second races; and an inertial biasing means pivotably supported by one of the group comprising said first race, said second race and said cage means for urging said clutch roller into wedging contact with said races.

2. The one-way clutch of claim 1, wherein said inertial biasing means comprises:

a slot in the annular surface of the second race, a counterweight pivotally mounted in the slot within the second race, said counterweight having an arm which is rotatable and engagable with said clutch roller when said races are rotated, whereby said counterweight is caused to pivot when said races are rotated and urge said clutch roller into wedging engagement with said races.

3. The one-way clutch of claim 2, further comprising:

a compression spring provided within the recess of said caging member having an end projecting from the recess of said caging member, a slot on the arm of said counterweight for receiving the projecting end of said spring.

4. The one-way clutch of claim 3, wherein the first race is provided radially inside, and coextensive with, the second race of the one-way clutch.

5. The one-way clutch of claim 4, wherein the clutch roller has a cylindrical shape.

6. The one-way clutch of claim 4, wherein the clutch roller has a spherical shape.

7. The one-way clutch of claim 1, wherein said inertial biasing means comprises:

a slot in the caging member, a counterweight pivotally mounted in the slot within the caging member, said counterweight having an arm which is rotatable and engagable with said clutch roller when said races are rotated, whereby said counterweight is caused to pivot when said races are rotated and urge said clutch roller into wedging engagement.

8. A one-way roller clutch, comprising:

a first race having a first annular surface;

a second race having a second annular surface with a wedging surface adjacent said first surface;

a clutch roller interposed between said first and second annular surfaces;

a cage means having a recess for retaining said clutch roller between said first and second races; and a ramped surface on the recess of said caging member, a reverse engagement roller interposed between the recess of said caging member and said clutch roller, whereby said reverse engagement roller urges said clutch roller into contact with the wedging surface of said second race and the annular surface of said first race when said reverse engagement roller is centrifugally forced into contact with the ramped surface of said caging member.

9. The one-way clutch of claim 8, further comprising:

a compression spring provided between the recess of said caging member and the reverse engagement roller for urging said reverse engagement roller out of said recess.

10. A method of retaining a one-way clutch in a locked-up condition, comprising:

providing a first race with an annular surface;

providing a second annular race adjacent said first race, the second race having a wedging surface adjacent the annular surface of said first race;

providing a clutch roller between said first and second races;

providing a caging means for retaining said clutch roller between said first and second races; and pivotably supporting an inertial means for urging said clutch roller into wedging engagement between said first and second surfaces by one of the group comprising said first and second races.

\* \* \* \* \*